Sept. 25, 1956 R. F. SIMPSON 2,764,213
DEMOUNTABLE SOLID RUBBER TIRE CONSTRUCTION
Filed Jan. 2, 1953
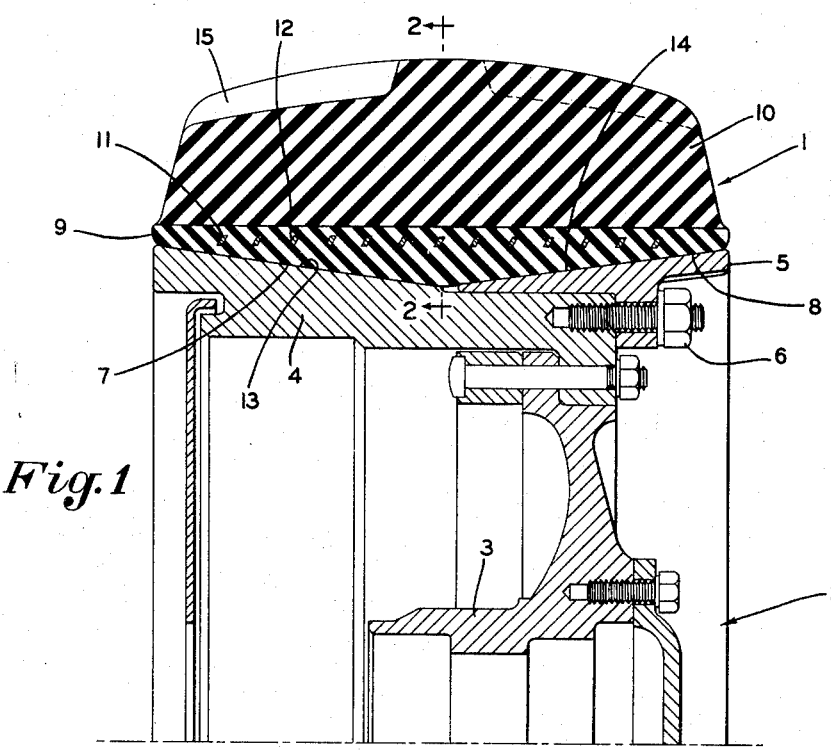
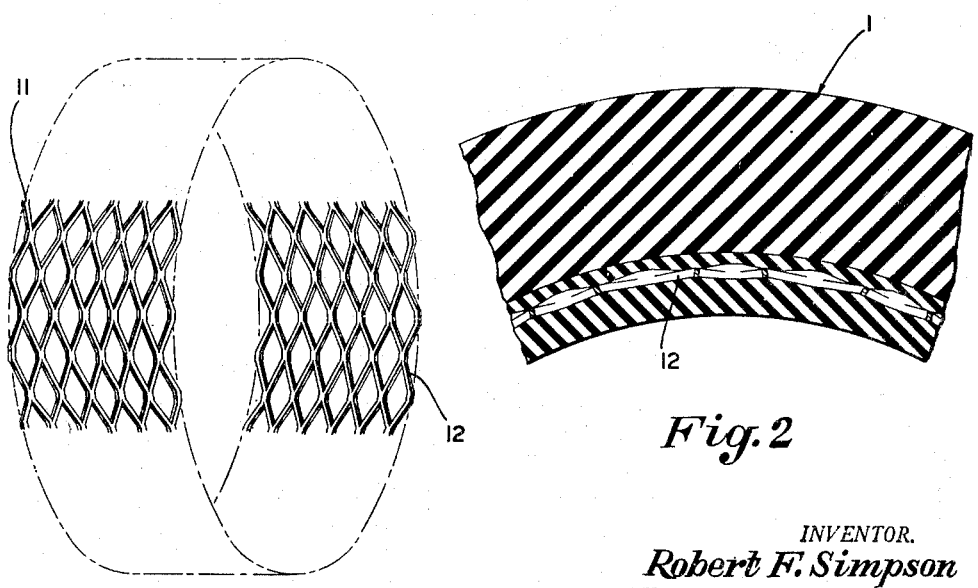
INVENTOR.
Robert F. Simpson
BY
Frease & Bishop
ATTORNEYS ABLE SOLID RUBBER TIRE
United States Patent Office 2,764,213
Patented Sept. 25, 1956

2,764,213

DEMOUNTABLE SOLID RUBBER TIRE CONSTRUCTION

Robert F. Simpson, Hartville, Ohio, assignor to The Monarch Rubber Company, Hartville, Ohio, a corporation of Ohio Application January 2, 1953, Serial No. 329,267

2 Claims. (Cl. 152—323)

The invention relates to demountable solid rubber tires and more particularly to a solid rubber tire construction which may be mounted in a demountable manner on the wheels of industrial trucks of various types and kinds that are used for materials handling.

Industrial trucks for many years have been equipped with solid and cushion rubber tires particularly in the wide use of such trucks in materials handling applications for a number of purposes. The use of such tires reduces the cost of vehicle maintenance, and vehicle load breakage is reduced as well as floor damage and maintenance resulting from the pounding of heavily loaded vehicles on floor surfaces traversed by the vehicles. Furthermore, the use of such tires on industrial trucks reduces the effort required to maneuver the vehicle, protects the driver from road shock and results in less driver fatigue.

Industrial solid tires heretofore used have been of two types, one in which the tire includes a cylindrical metal sleeve onto which the rubber is cured and which sleeve is pressed onto the cylindrical periphery of a wheel; and a second in which the rubber is cured directly onto a wheel.

Unfortunately, such industrial solid tire constructions present problems in tire maintenance or replacement. In the first instance, it is extremely difficult and time-consuming to remove a pressed-on tire from an industrial truck wheel where tire failure has occurred or where the tire has worn out and requires replacement. If an industrial truck, integrated in a materials handling program in a manufacturing plant, is out of service for a substantial length of time to permit a difficult and time-consuming tire replacement, heavy production losses may be incurred due to interruption of production.

Similarly, delays and expense incident to the replacement of cured-on tires, which involves the complete replacement of not only the tire but the truck wheel, are costly.

Accordingly, there has been an unsatisfied want, need and demand in the industrial truck field for an industrial solid tire construction which is demountable readily, quickly, easily and inexpensively so that a tire change can be made on the truck immediately when a tire failure occurs or when replacement is necessary in an exceedingly short time interval.

A solution to this problem has been proposed in which the truck wheel is provided with a double-wedge tapered periphery including a demountable wedge ring on which the tire may be removably mounted by removal or replacement of the wedge ring. This proposal involves a tire having an inner annular ring portion formed of hard rubber stock reinforced by multiple strand wire bead elements imbedded therein with a soft cushion portion vulcanized to the hard rubber base and with the hard rubber base formed with a double annular wedge surface complementary to the wheel wedge surfaces.

Unfortunately, such tire construction has not proven satisfactory in use and under overload. Early tire failures have occurred by cracking of the hard rubber around the wire beads which cracking extends to the zone connecting the hard and soft or cushion rubber and up into the cushion rubber resulting in complete tire failure.

Accordingly, it is a general object of the present invention to provide a new industrial solid tire construction which may be readily and quickly demountably mounted on an industrial truck wheel.

Furthermore, it is an object of the present invention to provide a new industrial solid rubber tire construction which may be demountably mounted on an industrial truck wheel, having a reinforced hard rubber base portion and a soft rubber load-carrying tread portion, in which cracking and tire failure of the hard rubber base portion adjacent and extending from the reinforcement is eliminated.

Also, it is an object of the present invention to provide a new industrial solid rubber tire construction involving a hard rubber base and a soft rubber tread portion, which has greater load-carrying capacity than prior solid rubber tire constructions including a hard rubber base portion.

Furthermore, it is an object of the present invention to provide a new industrial solid rubber tire construction which eliminates cracking or failure of the hard rubber base portion under over-load or shock conditions, and which provides for tire demountability.

Finally, it is an object of the present invention to solve problems existing in the art of industrial solid rubber tire construction, to eliminate prior art difficulties in the failure of demountable solid rubber tires, to eliminate prior art difficulties in the removal and replacement of pressed-on or cured-on solid rubber tires, to generally improve the construction and facility of use of industrial solid rubber tires, and to obtain the foregoing advantages and desiderata in a simple and effective manner.

These and other objects and advantages apparent to those skilled in the art from the following description and claims may be obtained, the stated results achieved, and the described difficulties overcome by the constructions, combinations, parts, elements and arrangements which comprise the present invention, the nature of which are set forth in the following general statement, a preferred embodiment of which—illustrative of the best mode in which applicant has contemplated applying the principles—is set forth in the following description and shown in the drawing; and which are more particularly and distinctly pointed out and set forth in the appended claims forming part hereof.

The nature of the improvements in demountable solid rubber tire construction of the present invention may be stated in general terms as including an annular hard rubber base portion having an inner, convex, double-tapered, annular wedge surface, an annular, soft, tough, load-carrying, cushion rubber composition tread portion vulcanized to the hard rubber base portion, and an endless, expanded metal ring imbedded in and vulcanized and bonded to the hard rubber base portion.

By way of example the improved demountable solid rubber tire construction of the present invention is shown in the accompanying drawing forming part hereof, wherein:

Figure 1 is a fragmentary sectional view through a typical wheel of an industrial truck with the improved solid rubber tire construction of the present invention demountably mounted thereon;

Fig. 2 is a fragmentary section looking in the direction of the arrows 2—2, Fig. 1; and Fig. 3 is a perspective view of the expanded metal ring element of the improved solid rubber tire construction of the present invention.

Similar numerals refer to similar parts throughout the various figures of the drawings.

The improved solid rubber tire construction of the present invention is illustrated generally at 1 in Fig. 1 demountably mounted on an industrial truck wheel generally indicated at 2. The wheel 2, which forms no part of the present invention, is only illustrated as a typical construction and may include a hub member 3 on which rim members 4 and 5 are mounted, the rim member 5 being demountable on removal of clamping nuts 6. When the demountable rim member 5 is assembled to the rim member 4, an annular double-tapered wedge surface comprising tapered annular surfaces 7 and 8 is formed for receiving the tire 1 to be demountably mounted thereon.

The tire 1 consists of an annular portion 9 formed of hard rubber with a solid, soft, cushion rubber tire or tread portion 10 vulcanized thereto, and having an endless expanded metal ring 11 imbedded in the hard rubber base portion 9.

In accordance with the present invention, the expanded metal ring 11 is formed to ring-shape by cutting a strip of expanded metal to the required length and butt-welding the ends of the strands 12 thereof to form the endless ring 11.

As shown in Figs. 1 and 2, each strand 12 of the expanded metal ring 11 is imbedded and completely surrounded by the hard rubber of base portion 9. The stiffness of the expanded metal when surrounded and imbedded in the hard rubber not only provides load-carrying capacity to the hard rubber, a characteristic normally absent from hard rubber in industrial truck tires when shock loads are applied thereto; but also holds the hard rubber against relative movement between the rubber and expanded metal, thus preventing the development of cracking of the hard rubber at the bond between the hard rubber and expanded metal which otherwise ultimately might extend into the soft rubber tread portion and result in tire failure.

The hard rubber base portion 9, as shown in Fig. 1, is formed with inner, annular, double-tapered wedge surfaces 13 and 14 which are complementary to the wedge surfaces 7 and 8 of the rim members 4 and 5 of the wheel 2.

The solid, soft, load-carrying, tread rubber portion 10 is permanently, uniformly and completely bonded by vulcanization to the hard rubber base portion 9.

The tire 1 can be mounted on or removed from the wheel 2 very quickly without taking an industrial truck equipped therewith out of service for a substantial time interval, by removal of the nuts 6 and wedge rim portion 5 from the wheel whereby the tire 1 can be displaced laterally, axially from the wheel. When mounting a new tire 1 on the wheel 2 it can be tightly secured in proper position by pulling up the nuts 6 which tightens the wedge rim portion 5 in a wedge-like manner against one of the tapered portions 13 or 14 of the hard rubber tire base portion 9.

However, this wedging action to tightly clamp and securely position the tire 1 on the wheel 2 does not subject the hard rubber base portion 9 to any strains which might cause cracking or rupture thereof because the expanding force of the wedge 5 is resisted by the endless expanded metal ring 11 imbedded in the hard rubber base portion 9.

Since the particular procedure by which the particular construction of the tire 1 is manufactured has an important bearing on the ability of the completed tire to be of a demountable type, on the one hand, and to carry the heavy loads and withstand the rough usage to which it is subjected when mounted on an industrial truck for long periods of time, on the other hand, such procedure will now be described in order to indicate the characteristics that are developed in the completed tire which enable the new results to be obtained.

The expanded metal ring member 11, as indicated above, is fabricated from cut lengths of expanded metal to form the endless or unitary ring shape. The expanded metal ring 11 is then degreased with acid or other typical or usual degreasing treatment after which the surfaces thereof are subjected to grit blasting.

The particular character of the grit blasting is of importance and is performed with metal grit having sharp or pointed surfaces as distinguished from shot which has rounded surfaces and which is sometimes used in shot blasting. The grit blasting of the surfaces of the expanded metal ring 11 and of the strands 12 thereof by sharp metal grit produces a roughened and indented abrasive type of surface on the surfaces thereof, with indentations that have sharp corners or edges in contrast to rounded surface indentations produced by shot blasting.

The grit blasted surfaces of the expanded metal ring 11 are then coated preferably by a heated spray coating of a bonding material typically used when bonding rubber to metal. There are a number of types of such bonding materials on the market, among which is a chlorinated bonding material which tightly adheres and mechanically bonds to the metal without chemical reaction with the metal, and which reacts during later vulcanization to tightly and completely bond the hard rubber base portion 9 to the expanded metal ring 11 imbedded therein.

The surfaces of the ring 11 and strands 12 thereof covered with the bonding material are then covered with a usual or typical rubber cement which acts primarily as a medium for protecting the bonding material during handling of the rings 11 in production. The rubber cement also performs the further function of providing increased adhesion between the ring 11 and the uncured hard rubber applied to the ring prior to vulcanization.

The ring 11 is then surrounded with uncured hard rubber to form the uncured base portion 9 in any one of a number of manners. An extruded hard rubber composition shape may be cut in a piece having sufficient length to be inserted annularly within an expanded metal ring 11, the extruded shape having in general the cross-sectional shape of the portion of the hard rubber base 9 within expanded metal ring 11 illustrated in Fig. 1. After such extruded shape is applied to the ring, further hard rubber composition may be calendered onto the periphery of the expanded metal ring 11 to the approximate thickness illustrated in Fig. 1.

In the alternative, the entire amount of uncured hard rubber composition, in which the expanded metal ring 11 is imbedded, may be applied to the ring by calendering.

After the uncured hard rubber has been applied to the expanded metal ring 11 to form the base portion 9, sufficient uncured tread cushion rubber composition stock may be calendered onto the hard rubber base to build up the radial thickness of the soft rubber portion 10 to the desired weight and thickness.

In the alternative, an extruded soft rubber composition shape may be cut in a piece having sufficient length to be wrapped and spliced around the hard rubber base 9, the extruded piece having in general the cross-sectional shape of the rubber tread portion 10 illustrated in Fig. 1.

After the uncured hard and soft rubber portions 9 and 10 have been applied to the expanded metal ring 11, the tire is placed in a vulcanizing mold and vulcanized in the usual manner after which it is removed, buffed and inspected.

The composition of the rubber from which the solid rubber tread portion 10 is formed is such as to provide when vulcanized a soft, tough, rubber tread portion having cushion, high-load, carrying characteristics so as to withstand the loading and shock to which the tire is subjected when installed and operated on an industrial truck.

Although the use of a bonding material in vulcanizing rubber to metal is known, the particular load sustaining stiff and strong expanded metal reinforcing ring 11, together with the sharply indented grit blasted surfaces of the same and of the strands 12 thereof, cooperate with the hard rubber in the hard rubber base portion 9 when vulcanized thereto so as to provide not only a uniform, complete and efficient bond therebetween which will not crack under over-loading, but also strength and load-carrying capacity to the hard rubber base so as to withstand internal expanding when the wedge rim member 5 of the wheel 2 is tightened and severe shock loading to which the tire 1 may be subjected in use. Thus, the improved tire construction has a greater load-carrying capacity for the same rubber volume than has heretofore been present in solid rubber tires formed of a hard rubber base and a cushion rubber tread portion adapted for demountable mounting.

The rubber tread portion 10 of the demountable tire 1 may be formed on its periphery with any desired traction tread configuration illustrated generally at 15, the shape of said tread configuration being imparted by the shape of the vulcanizing mold, or where desired a plain rather than a traction tread may be provided.

Also, the diameter, width and thickness of the improved demountable solid rubber tire construction may be altered from the particular relationship illustrated in the drawing to satisfy the load-carrying characteristics required for any particular installation.

Accordingly, the present invention provides a new, solid rubber industrial tire having maximum load-carrying characteristics because of the expanded metal reinforcing ring imbedded in the hard rubber portion thereof preventing failure of the hard rubber base portion under shock loads or under over-loads, which can be quickly and easily applied to and removed from an industrial truck wheel in a minimum amount of time where tire changes are required; provides a demountable industrial solid tire construction eliminating the difficulties heretofore present where hard rubber has been used therein; provides a load-carrying industrial solid tire which is demountable yet rugged, sturdy and long-lived in use; and provides an industrial solid rubber tire construction which overcomes prior art difficulties and solves longstanding problems in the art.

In the foregoing description, certain terms have been used for brevity, clearness and understanding; but no unnecessary limitations are to be implied therefrom beyond the requirements of the prior art, because such terms are utilized for descriptive purposes herein and not for the purpose of limitation, and are intended to be broadly construed.

Moreover, the description of the improvements is by way of example, and the scope of the present invention is not limited to the exact details illustrated or to the specific size and shape shown.

Having now described the features, discoveries, and principles of the present invention, the manufacture and use of the improved solid rubber tire construction, the characteristics thereof, and the advantageous, new and useful results obtained thereby; the new and useful constructions, combinations, parts, elements, arrangements, discoveries and principles, and mechanical equivalents obvious to those skilled in the art are set forth in the appended claims.

I claim:

1. A demountable solid rubber tire consisting of an annular hard rubber base portion having an inner, convex, double-tapered, annular, hard rubber, wedge surface; an annular, soft, tough, load-carrying, cushion rubber composition tread portion vulcanized to the hard rubber base portion; and an endless stiff expanded metal ring imbedded in and vulcanized and bonded to the hard rubber base portion holding the hard rubber base portion against rupture from and resisting and withstanding internal expanding from the expanding force of a wheel wedge mounting device engaging said hard rubber wedge surface, said ring holding the hard rubber base against relative movement between the rubber and expanded metal, and said ring providing load-carrying capacity for the hard rubber base.

2. A demountable solid rubber tire consisting of an annular hard rubber base portion having an inner, convex, double-tapered, annular, hard rubber, wedge surface; an annular, soft, tough, load-carrying, cushion rubber composition tread portion vulcanized to the hard rubber base portion; an endless stiff expanded metal ring imbedded in and vulcanized and bonded to the hard rubber base portion holding the hard rubber base portion against rupture from and resisting and withstanding internal expanding from the expanding force of a wheel wedge mounting device engaging said hard rubber wedge surface, said ring holding the hard rubber base against relative movement between the rubber and expanded metal, and said ring providing load-carrying capacity for the hard rubber base; and the surfaces of the expanded metal ring to which the hard rubber is bonded being roughened with sharp grit blasted indentations having sharp edge and corner configurations.

References Cited in the file of this patent

UNITED STATES PATENTS

| | | |
|---|---|---|
| 1,410,760 | Kepler | Mar. 28, 1922 |
| 1,593,751 | Carter | July 27, 1926 |
| 2,148,658 | Stiffler | Feb. 28, 1939 |
| 2,409,759 | Hosking | Oct. 22, 1946 |
| 2,525,196 | Bacon | Oct. 10, 1950 |
| 2,709,471 | Smith et al. | May 31, 1955 |

FOREIGN PATENTS

| | | |
|---|---|---|
| 246,489 | Italy | Mar. 25, 1926 |